(12) United States Patent
Wei et al.

(10) Patent No.: US 12,191,715 B2
(45) Date of Patent: Jan. 7, 2025

(54) PERMANENT MAGNET ROTOR STRUCTURE FOR UNDERWATER MOTOR, UNDERWATER MOTOR AND UNDERWATER EQUIPMENT

(71) Applicant: DEEPINFAR OCEAN TECHNOLOGY INC., Tianjin (CN)

(72) Inventors: Jiancang Wei, Teda (CN); Chao Chen, Teda (CN)

(73) Assignee: DEEPINFAR OCEAN TECHNOLOGY INC., Teda (CN)

( * ) Notice: Subject to any disclaimer, the term of this patent is extended or adjusted under 35 U.S.C. 154(b) by 236 days.

(21) Appl. No.: 17/784,824

(22) PCT Filed: Nov. 20, 2020

(86) PCT No.: PCT/CN2020/130284
§ 371 (c)(1),
(2) Date: Jun. 13, 2022

(87) PCT Pub. No.: WO2021/129260
PCT Pub. Date: Jul. 1, 2021

(65) Prior Publication Data
US 2023/0008985 A1    Jan. 12, 2023

(30) Foreign Application Priority Data

Dec. 24, 2019 (CN) .......................... 201911349565.X

(51) Int. Cl.
*H02K 1/27* (2022.01)
*H02K 1/2791* (2022.01)
(Continued)

(52) U.S. Cl.
CPC ............. *H02K 1/2791* (2022.01); *H02K 1/28* (2013.01); *H02K 5/132* (2013.01); *H02K 15/03* (2013.01); *H02K 2213/03* (2013.01)

(58) Field of Classification Search
CPC ........ H02K 1/2791; H02K 1/28; H02K 5/132; H02K 15/03; H02K 2213/03
(Continued)

(56) References Cited

U.S. PATENT DOCUMENTS

| 4,678,954 A | * | 7/1987 | Takeda ................... H02K 1/278 29/598 |
| 5,111,094 A | * | 5/1992 | Patel ...................... H02K 1/278 29/598 |

(Continued)

FOREIGN PATENT DOCUMENTS

| CN | 103312062 A | 9/2013 |
| CN | 206389186 U | 8/2017 |

(Continued)

OTHER PUBLICATIONS

Machine translation of CN 107419231 Chen et al. (Year: 2019).*

(Continued)

*Primary Examiner* — Terrance L Kenerly
(74) *Attorney, Agent, or Firm* — Maier & Maier, PLLC

(57) ABSTRACT

A permanent magnet rotor structure for an underwater motor, an underwater motor and underwater equipment, related to the field of motors. The permanent magnet rotor structure for the underwater motor includes a rotor end cover; a plurality of permanent magnets arranged on an inner circumferential surface of the rotor end cover; a protective attachment structure arranged on surfaces of the plurality of permanent magnets; and an adhesive layer for adhering the protective attachment structure to the surfaces of the plurality of permanent magnets and covering the protective attachment structure. The permanent magnet rotor structure has characteristics of corrosion resistance and wear (Continued)

resistance, so that the service life of the underwater motor comprising the permanent magnet rotor structure can be prolonged.

8 Claims, 6 Drawing Sheets

(51) Int. Cl.
    *H02K 1/28*         (2006.01)
    *H02K 5/132*      (2006.01)
    *H02K 15/03*      (2006.01)

(58) Field of Classification Search
    USPC ..................................................... 310/156.01
    See application file for complete search history.

(56) References Cited

U.S. PATENT DOCUMENTS

2015/0318747 A1   11/2015   Kamiyoshihara
2017/0346352 A1*  11/2017   Ouyang ................ H02K 21/22

FOREIGN PATENT DOCUMENTS

| | | | | |
|---|---|---|---|---|
| CN | 209046384 | U | 6/2019 | |
| CN | 107419231 | * | 11/2019 | ............ H01F 41/02 |
| CN | 111313583 | A | 6/2020 | |
| JP | H11166500 | A | 6/1999 | |
| JP | 200195196 | A | 4/2001 | |
| JP | 2001-231200 | A | 8/2001 | |
| JP | 200439822 | A | 2/2004 | |
| JP | 2008178295 | A | 7/2008 | |
| JP | 2013188005 | A | 9/2013 | |
| JP | 5963479 | B2 | 8/2016 | |
| WO | WO2018054679 | * | 3/2018 | ........... H02K 1/2726 |
| WO | 2013026693 | A2 | 2/2023 | |

OTHER PUBLICATIONS

Extended Search Report issued on Oct. 27, 2023, in corresponding European Application No. 20904608.5, 9 pages.
Office Action issued on May 23, 2023, in corresponding Japanese Application No. 2022-534145, 9 pages.
International Search Report mailed Feb. 5, 2021, in corresponding to International Application No. PCT/CN2020/130284; 6 pages (with English Translation).

* cited by examiner

PERMANENT MAGNET ROTOR STRUCTURE FOR UNDERWATER MOTOR, UNDERWATER MOTOR AND UNDERWATER EQUIPMENT

CROSS-REFERENCE TO RELATED APPLICATION(S)

This application is a 371 application of International Application No. PCT/CN2020/130284, filed on Nov. 20, 2020, which claims priority to Chinese Patent Application No. 201911349565.X, filed on Dec. 24, 2019, the contents of both of which are herein incorporated by reference in their entireties.

TECHNICAL FIELD

The application relates to the field of motors, in particular to a permanent magnet rotor structure for an underwater motor, the underwater motor and an underwater equipment.

BACKGROUND

Among commonly used underwater equipment, an outer rotor motor is characterized by its small space occupation, compact design and attractive appearance. Because of the special working environment of underwater motors, a permanent magnet rotor structure generally needs to be subjected to anti-corrosion and wear-resistance treatment so as to protect a rotor permanent magnet.

The above information disclosed in the background art section is only used to enhance the understanding of the background of the invention, so it may contain information that does not constitute the prior art known to those of ordinary skill in the art.

SUMMARY

The purpose of the application is to provide a permanent magnet rotor structure for an underwater motor. The structure has excellent corrosion resistance and wear resistance and can work in a special environment for a long time.

According to one aspect of the application, a permanent magnet rotor structure for an underwater motor is provided, which comprises a rotor end cover; a plurality of permanent magnets arranged on an inner circumferential surface of the rotor end cover; and a protective attachment structure arranged on surfaces of the plurality of permanent magnets.

According to some embodiments of the application, the adhesive layer has a smooth surface.

According to some embodiments of the application, a surface of the adhesive layer is free of any visible bubble.

According to some embodiments of the application, the adhesive layer comprises an acrylic structural adhesive.

According to some embodiments of the application, the adhesive layer seals the plurality of permanent magnets.

According to some embodiments of the application, the protective attachment structure is made of a nonmagnetic material.

According to some embodiments of the application, the protective attachment structure comprises a nonmagnetic stainless steel mesh, a nylon cloth or a mesh woven with anti-corrosion wires.

According to some embodiments of the application, the nonmagnetic stainless steel mesh comprises a 316L stainless steel mesh.

According to some embodiments of the application, a thickness of the 316L stainless steel mesh ranges from 0.01 mm to 0.07 mm.

Another aspect of the application also relates to an underwater motor, which comprises any permanent magnet rotor structure as described above.

Another aspect of the application also relates to underwater equipment, which comprises the underwater motor as described above.

As mentioned above, the nonmagnetic stainless steel mesh, the nylon cloth and the mesh woven with anti-corrosion wires all have good mechanical properties and good ductility, thus protecting the permanent magnets against damage from external hard particles. The attachment structure is resistant to chemical corrosion to a certain degree, and can be combined with the adhesive layer to form an anti-corrosion protection structure for the permanent magnets. However, bubbles may be generated when an adhesive layer with a protective attachment structure is made. For an adhesive layer with bubbles on its surface, the bubbles may be regarded as a channel. Seawater may make contact with the permanent magnets through the channel formed by the bubbles, thus corroding the permanent magnets. The adhesive layer with the smooth surface as described above may effectively isolate seawater from the permanent magnets, thus preventing seawater from corroding the permanent magnet structure. Besides, the adhesive layer with the smooth surface may also make the protective attachment structure adhere more firmly, and prevent the protective attachment structure from falling off due to the existence of bubbles.

The underwater equipment mentioned above comprises an underwater photographic equipment carrier, an underwater propeller, etc. The underwater equipment is equipped with the underwater motor. Because the permanent magnet rotor structure for the underwater motor has the characteristics of corrosion resistance and wear resistance, the underwater motor may work in a harsh working environment. Therefore, compared with underwater motors in the prior art, the underwater motor provided in this application has a longer service life.

BRIEF DESCRIPTION OF THE DRAWINGS

The drawings, as part of this application, are used to provide a further understanding of this application. The illustrative embodiments and descriptions of this application are used to explain this application, and do not constitute undue restrictions on this application. In the drawings.

DETAILED DESCRIPTION OF THE EMBODIMENTS

Figure 1:
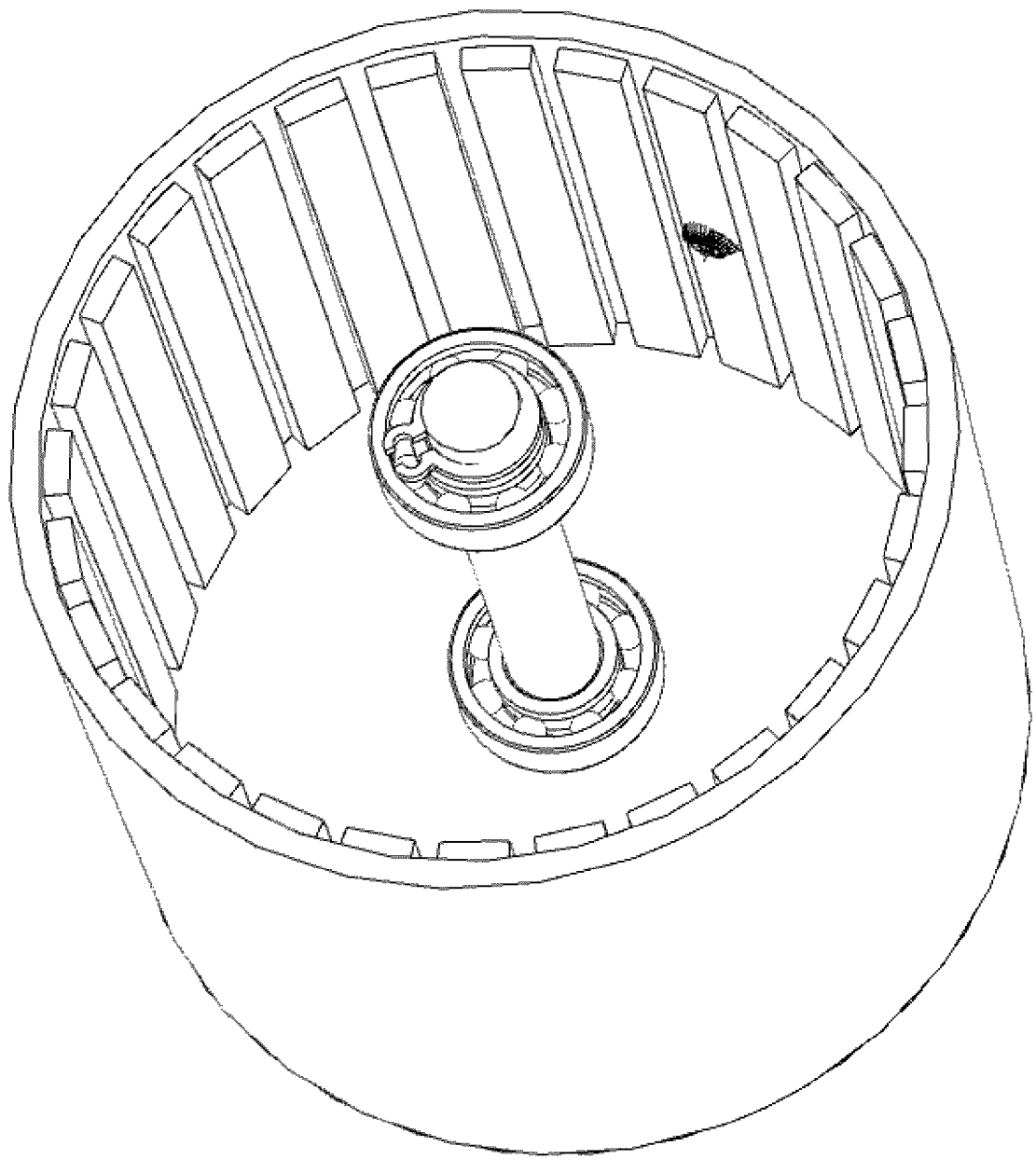
FIG. 1 shows a photograph of a permanent magnet rotor structure for a motor in the related art.

Hereinafter, the specific implementations of the application will be described in further detail with reference to the drawings and embodiments in order to gain a better understanding of the scheme of the application and the advantages of various aspects thereof. However, the specific implementations and embodiments described below are only for the purpose of illustration, and not for the limitation of the application.

Unless otherwise expressly stated or defined, the term "connection" mentioned in this application should be broadly understood, and may be direct connection or a replacement of the original direct connection manner. Moreover, the orientation or position relationship indicated by "upper", "lower", "left", "right", "upper end" and "lower end" described in this application is based on the orientation and position relationship shown in the drawings, which is only for describing and simplifying the description, and does not indicate or imply that the indicated device or element must have a specific orientation, be constructed and operated in a specific orientation, so it cannot be understood as a limitation of this application. In addition, the terms "first", "second", "in the first place", "in the second place", "in the third place" and "further" are only used for descriptive purposes, and cannot be understood as indicating or implying relative importance or implicitly indicating the number of indicated technical features. Thus, the features defined by "first" and "second" may explicitly or implicitly include one or more of the features. In the description of this application, "a plurality of" means two or more, unless otherwise specifically defined.

In the description of this application, it should be noted that, unless otherwise expressly stated and defined, the terms "arrangement", "bonding", "sticking" and "connection" should be understood broadly, for example, they may be fixed connection, detachable connection or integrated connection. For those of ordinary skill in the art, the specific meanings of the above terms in this application may be understood according to specific situations.

The following disclosure provides many different embodiments or examples for implementing different structures of this application. In order to simplify the disclosure of this application, the components and arrangements of specific examples are described below. Of course, they are only examples and are not intended to limit the application. In addition, the application provides examples of various specific processes and/or materials, but one of ordinary skill in the art may realize the application of other processes and/or the use of other materials.

FIG. 1 shows a rotor structure for a motor in the related art.

Referring to FIG. 1, at present, an anti-corrosion treatment technology for an outer rotor underwater motor comprises spraying an anti-corrosion layer on a surface of a permanent magnet. When the motor works underwater, hard objects like gravel will inevitably enter a position between a rotor and a stator of the motor, thus damaging the anti-corrosion coating layer on the surface of the rotor permanent magnet.

Figure 2:
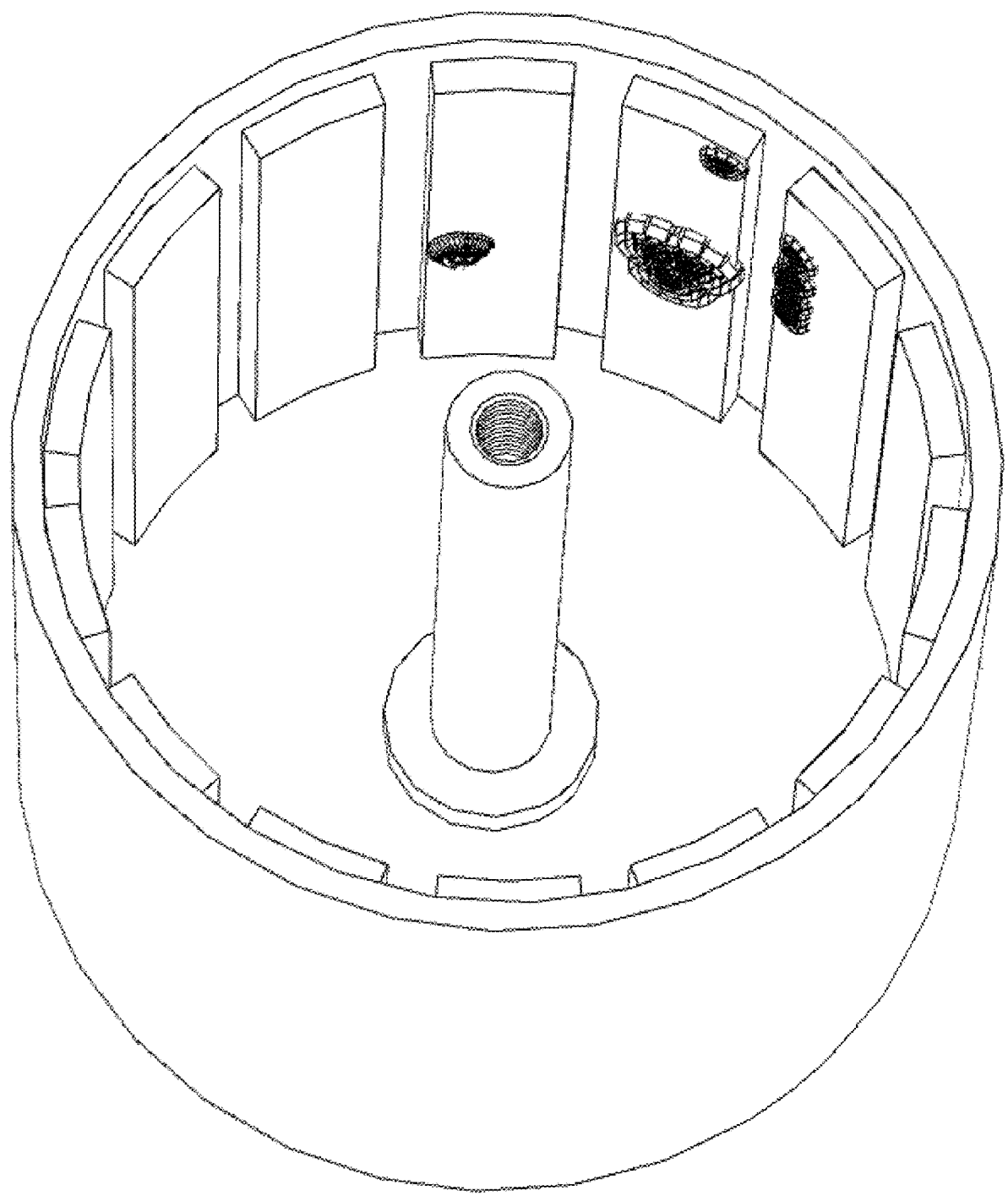
FIG. 2 shows a photograph of a permanent magnet rotor structure for a motor in the related art after being used for a period of time.

Referring to FIG. 2, when the anti-corrosion layer on the surface of the permanent magnet is damaged, the part of the permanent magnet that is not protected by the anti-corrosion layer will be corroded by seawater.

In addition, in the prior art, another anti-corrosion and wear-resistant scheme is to seal the whole permanent magnet rotor structure in a stainless steel housing through stainless steel welding, so as to protect the permanent magnet rotor structure for the motor. This technology has the defects of high manufacturing cost and strict technological requirements, and is not suitable for low-cost recreational products. Moreover, technical defects, such as a leak in the welding seal, occur, the overall welding protection will be invalid.

In view of this, this embodiment relates to a permanent magnet rotor structure for an underwater motor. Exemplary embodiments of the application will be described below with reference to the accompanying drawings.

Figure 3:
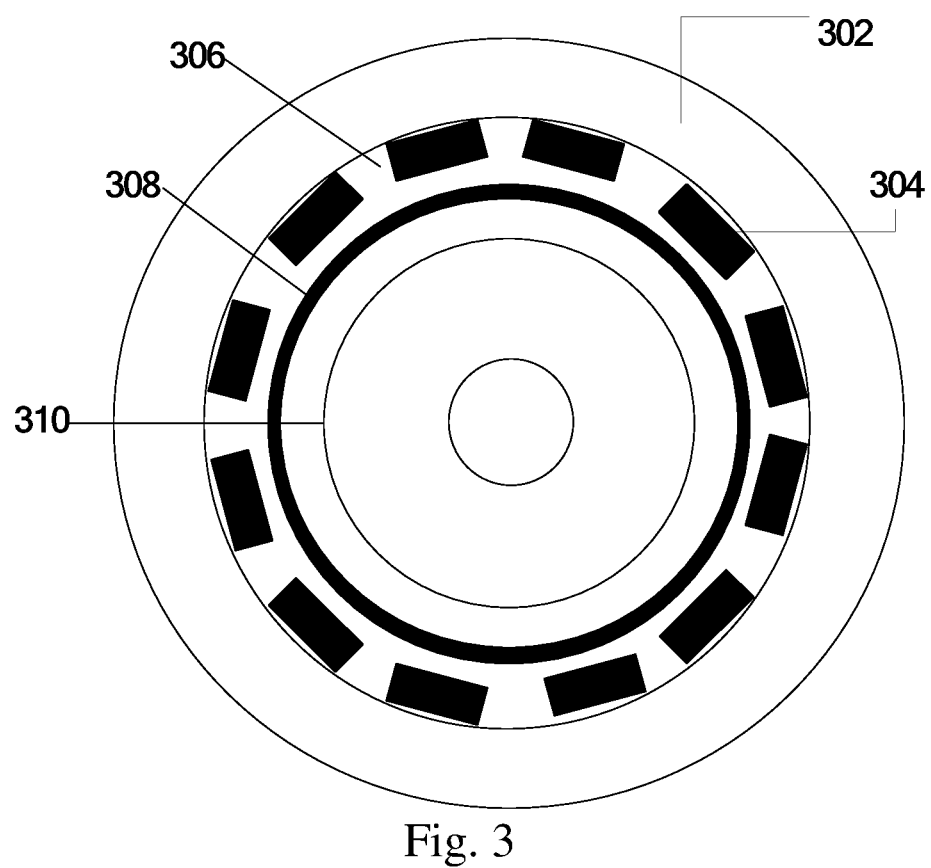
FIG. 3 shows a permanent magnet rotor structure for a motor according to an exemplary embodiment of the application.

FIG. 3 shows a permanent magnet rotor structure for a motor according to an exemplary embodiment of the application.

Referring to FIG. 3, the permanent magnet rotor structure for the underwater motor in this embodiment comprises a motor permanent magnet rotor end cover 302, a plurality of motor permanent magnets 304, an adhesive layer 306 and a protective attachment structure 308, which are connected together to form the permanent magnet rotor structure for the underwater motor in this embodiment. By comparing the permanent magnet rotor structure in this embodiment as shown in FIG. 3 with the permanent magnet structure for the motor in the prior art as shown in FIG. 1, an obvious difference may be seen.

Referring to FIG. 3, the motor permanent magnet rotor end cover 302 is part of a generalized motor.

According to the exemplary embodiment of the application, the rotor end cover 302 may be made of a wide range of materials, such as aluminium alloy, stainless steel, engineering plastic PVC or ABS rubber.

In this embodiment, the rotor end cover 302 is made of stainless steel, and is similar to a hollow cylinder in shape and appearance. One end of the rotor end cover 302 may be sealed and connected to other structures of the motor, and the other end (perpendicular to the view direction) is open. In this embodiment, the rotor end cover 302 may be molded by machining or other methods. The rotor structure for the motor is well known to those skilled in the art, so it will not be described in detail here. It should be noted that in the rotor structure for the motor shown in FIG. 3, the size and shape of the end cover of the permanent magnet rotor structure may be changed according to actual needs, and the manufacturing method may also be adjusted according to actual needs.

Referring to FIG. 3, the plurality of permanent magnets 304, which are part of the generalized motor, are arranged on an inner circumferential surface (inner wall) of the motor permanent magnet rotor end cover 302 and evenly distributed. Permanent magnets generally refer to magnets that can retain high remanence for a long time in an open circuit state, such as natural magnets and artificial magnets. In this embodiment, in the permanent magnet rotor structure for the underwater motor, the plurality of permanent magnets 304 are alloy permanent magnets, rare earth permanent magnets, samarium cobalt permanent magnets, ferrite permanent magnets, or the like.

In this embodiment, a stator of the motor is stationary. The stator consists of an iron core, a stator winding and a base.

Referring to FIG. 3, in this embodiment, the adhesive layer 306 is made of an acrylic structural adhesive.

According to an exemplary embodiment, the selected acrylic structural adhesive may replace traditional adhesive materials. Compared with mechanical fixation, the use of the acrylic structural adhesive allows design and manufacturing to be more flexible and cost to be lower.

The adhesive layer 306 is formed by curing the acrylic structural adhesive. The adhesive layer 306 has excellent waterproofness and chemical corrosion resistance, and also has good mechanical properties after reaching a certain thickness. The adhesive layer 306 is made by completely coating surfaces of the permanent magnets with the acrylic structural adhesive so that the whole permanent magnet structure is covered without obvious defects. It should be noted that the adhesive layer 306 may also be formed by curing other structural adhesives, such as modified acrylate structural adhesive.

Referring to FIG. 3, the protective attachment structure 308 in the permanent magnet rotor structure for the underwater motor in this embodiment is fixed to the surfaces of the plurality of permanent magnets 304 by the adhesive force of the adhesive layer 306. In this embodiment, the protective attachment structure 308 is made of a 316L stainless steel mesh. The mesh number of the selected 316L stainless steel mesh 308 is 350-400, and the thickness is 0.01-0.07 mm.

In this embodiment, the 316L stainless steel mesh is made of titanium steel and has excellent corrosion resistance, high temperature resistance and creep resistance. The combination of the protective attachment structure 308 and the adhesive layer structure 306 may protect the permanent magnets against corrosion from seawater and damage from hard objects in a specific working environment. Further, the protective attachment structure 308 made of the 316L stainless steel mesh has no magnetism, generates no magnetic action with the permanent magnets, and thus will not affect the work of the whole permanent magnet rotor structure.

In this embodiment, after the stainless steel mesh 308 of the protective attachment structure 316L is selected, the stainless steel mesh 308 is coated with a layer of acrylic structural adhesive and placed on an uncured adhesive layer structure, so that the acrylic structural adhesive in the adhesive layer structure is completely fused with the structural adhesive on the steel mesh, and the adhesive completely covers the whole stainless steel mesh, that is, the acrylic structural adhesive soaks into the stainless steel mesh.

In order to make the acrylic structural adhesive completely soak into the stainless steel mesh, an operator may use a professional adhesive brush-coating tool to apply the acrylic structural adhesive onto the stainless steel mesh repeatedly with a small amount applied each time, observe the state of the steel mesh in real time, make the coating as smooth as possible, and repair defects whenever needed.

Finally, in this embodiment, after the adhesive layer structure 306 made of the acrylic structural adhesive is naturally cured, the permanent magnet rotor structure shown in FIG. 3 will be formed, and the curing time of the acrylic structural adhesive is generally 3-5 minutes.

In order to verify that the structure manufactured in this embodiment has the characteristics of corrosion resistance and wear resistance, the underwater motor containing the permanent magnet rotor structure in this embodiment was put into 80° C. seawater to work constantly for 168 hours. Compared with the severe corrosion of a permanent magnet rotor structure for an underwater motor in the prior art, the structure in this embodiment had no obvious corrosion.

The application provides a low-cost permanent magnet rotor structure in another exemplary embodiment.

The permanent magnet rotor structure in this embodiment comprises a rotor end cover, a plurality of permanent magnets, an adhesive layer, a protective attachment structure and an adhesive layer with a smooth surface.

The rotor end cover in this embodiment is part of an underwater propeller. The rotor end cover is mainly made of carbon fiber, which is light in weight and resistant to wear.

The adhesive layer in the permanent magnet rotor structure in this embodiment is formed by curing the acrylic structural adhesive. The adhesive layer structure is also provided with the protective attachment structure. In this embodiment, the material of the protective attachment structure is a nonmagnetic 316L stainless steel mesh.

The mesh number of the nonmagnetic 316L stainless steel mesh is 350-400, so that the 316L stainless steel mesh can effectively isolate hard objects such as gravel, and sufficient pores are provided for the acrylic structural adhesive in the adhesive layer to fully soak into the 316L stainless steel mesh, making the two fully combined.

When the adhesive layer completely soaks into the 316L stainless steel mesh, several magnetic stainless steel sheets with a thickness of 0.01-0.05 mm are placed on a surface of the uncured adhesive layer, according to a curvature radius of an inner wall of the adhesive layer if possible. It should be noted that before the stainless steel sheets are placed, a layer of clear tape is applied to both sides of each stainless steel sheet, or a layer of release agent is sprayed onto each stainless steel sheet, and then the stainless steel sheets are gently placed on the surface of the uncured adhesive layer. In this way, the steel sheets may be easily removed subsequently.

According to some embodiments, some types of stainless steel sheets are magnetic, and may interact with the permanent magnets to generate magnetic force, which is applied to the surface of the adhesive layer, squeezing out bubbles on the surface of the adhesive layer and a surface of the stainless steel mesh, and naturally compacting the adhesive layer. After the acrylic structural adhesive of the adhesive layer is cured, the steel sheets will not be bonded to the adhesive layer due to the existence of the clear tape or release agent, so that the stainless steel sheets can be easily removed or demoulded. At this point, the adhesive layer with a very smooth surface and no visible bubbles in this embodiment is obtained.

In the permanent magnet rotor structure in the above embodiment, the adhesive layer on the surfaces of the permanent magnets serves as an anti-corrosion structure, and some anti-corrosion meshes or cloths are arranged in the adhesive layer. In a manufacturing process of the anti-corrosion structure mentioned above, bubbles covering a large area may appear on surfaces of the meshes and cloths after adhesive coating. The existence of the bubbles on the surface of the adhesive layer makes the adhesive force of the anti-corrosion cloths or meshes in the adhesive layer insufficient, which causes the anti-corrosion cloths or meshes to fall off easily. In addition, the bubbles are equivalent to a channel through which seawater may make contact with the permanent magnets of the motor rotor structure and corrode the permanent magnets. Moreover, hard objects such as gravel will directly or indirectly damage the anti-corrosion structure due to the bubble defect.

Figure 4A:
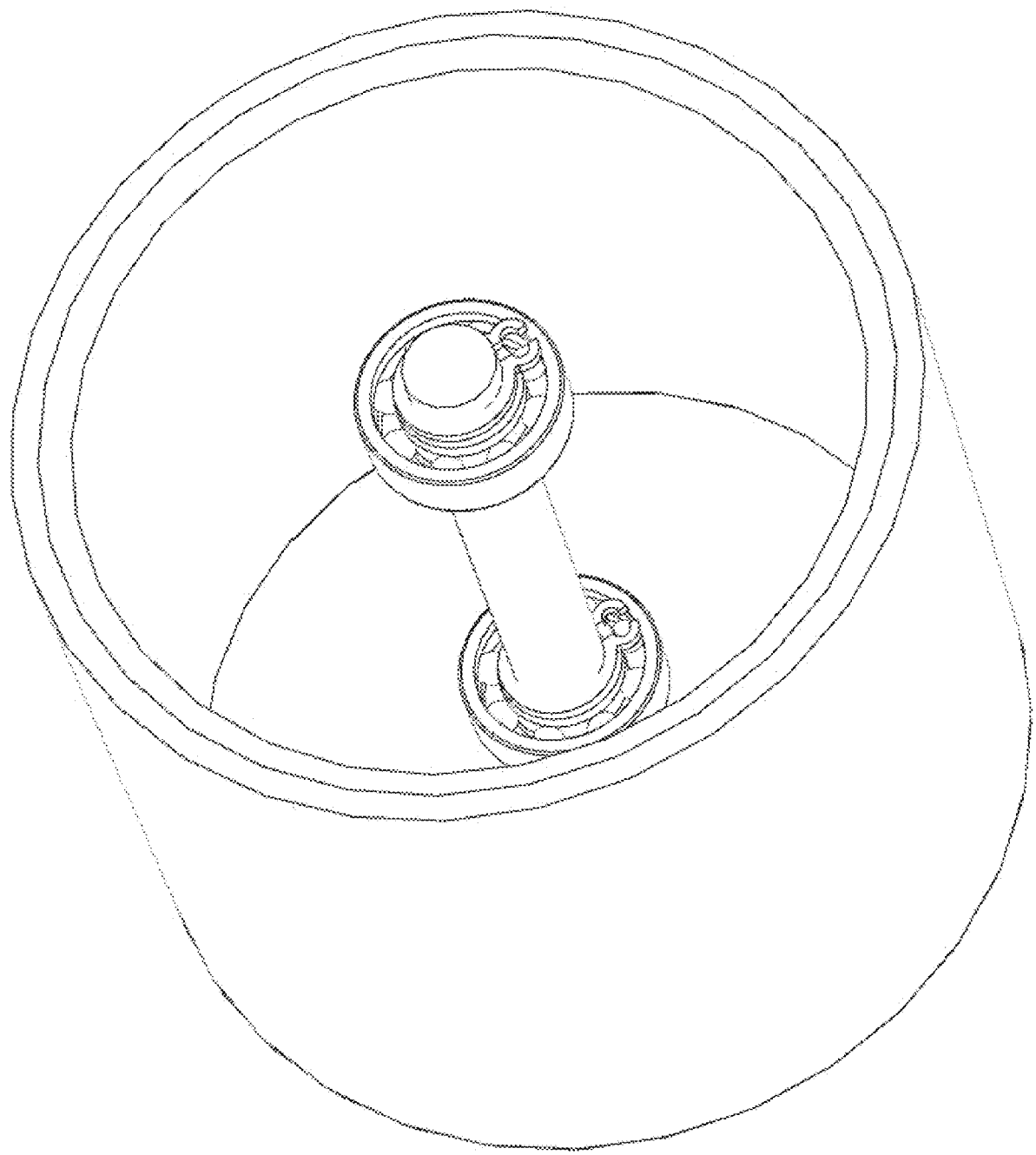
FIG. 4A shows a photograph of a permanent magnet rotor structure for a motor according to an exemplary embodiment of the application.

FIG. 4A shows a photograph of a motor rotor structure according to an exemplary embodiment of the application.

Figure 4B:
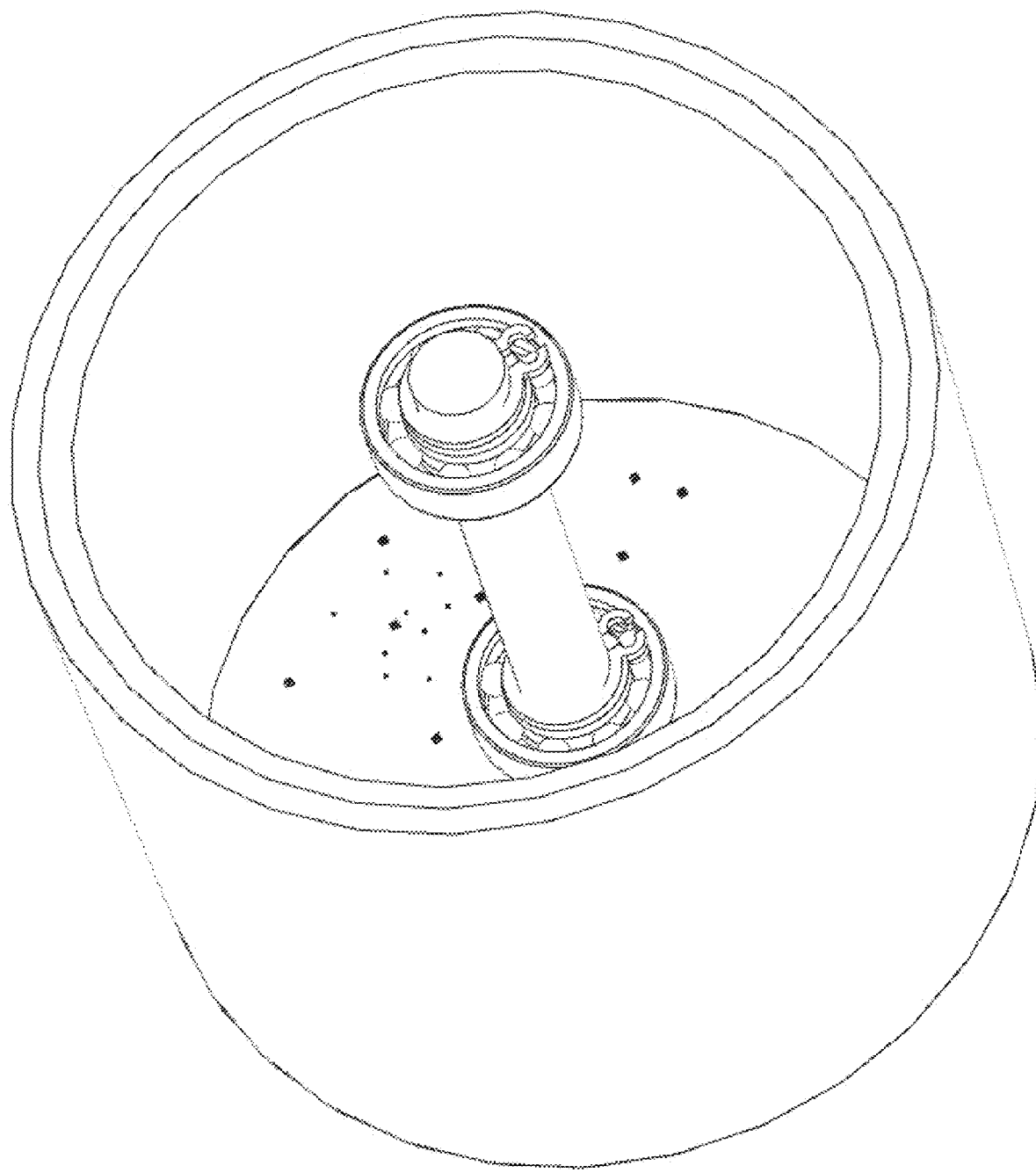
FIG. 4B shows a photograph of a permanent magnet rotor structure for a motor according to an exemplary embodiment of the application after being tested.

In order to verify that the permanent magnet rotor structure in this embodiment has the properties of corrosion resistance and wear resistance, the underwater motor containing the motor rotor structure provided in the application in FIG. 4A was put into 80° C. seawater to work for 168 hours. The underwater motor included in the underwater equipment provided in this embodiment comprises a permanent magnet rotor structure with a smooth surface. The test result shows that the permanent magnet rotor structure was not corroded. Subsequently, the structure continued to work in a sand pit for 168 hours, as shown in FIG. 4B. After the test, no obvious scratch was seen on the permanent magnet rotor structure of the motor in the exemplary embodiment of the application.

In this structure, the acrylic structural adhesive is used to bond the whole stainless steel mesh on the surfaces of the rotor permanent magnets, an end is sealed by an adhesive, and the bubbles in the adhesive layer are completely eliminated by the magnetic force of the magnets. In this way, the cost is reduced, and the influence of the bubble defect on the adhesive force of the stainless steel mesh is avoided, so that the rotor can be completely sealed against corrosion and wear.

The invention is applied to the motor rotor structure. The motor rotor is also a rotating component in the motor, which is used to realize the conversion between electric energy and mechanical energy. Motor rotors have an inner rotor transmission mode and an outer rotor transmission mode, and motor rotors with the outer rotor transmission mode are mostly used for underwater motors, such as the rotor for an outer rotor motor in this embodiment. The permanent magnet rotor structure of the underwater motor has good corrosion resistance and wear resistance in a special working environment, thus prolonging the service life of the motor, reducing the production cost and saving resources.

The application also provides a permanent magnet rotor structure for a motor in another embodiment, which will be explained hereinafter with reference to the drawings.

Referring to FIG. 3, according to an exemplary embodiment, the permanent magnet rotor structure comprises a rotor end cover 302, a plurality of permanent magnets 304, an adhesive layer 306, a protective attachment structure 308, and an adhesive layer 310 with a smooth surface.

Figure 5:
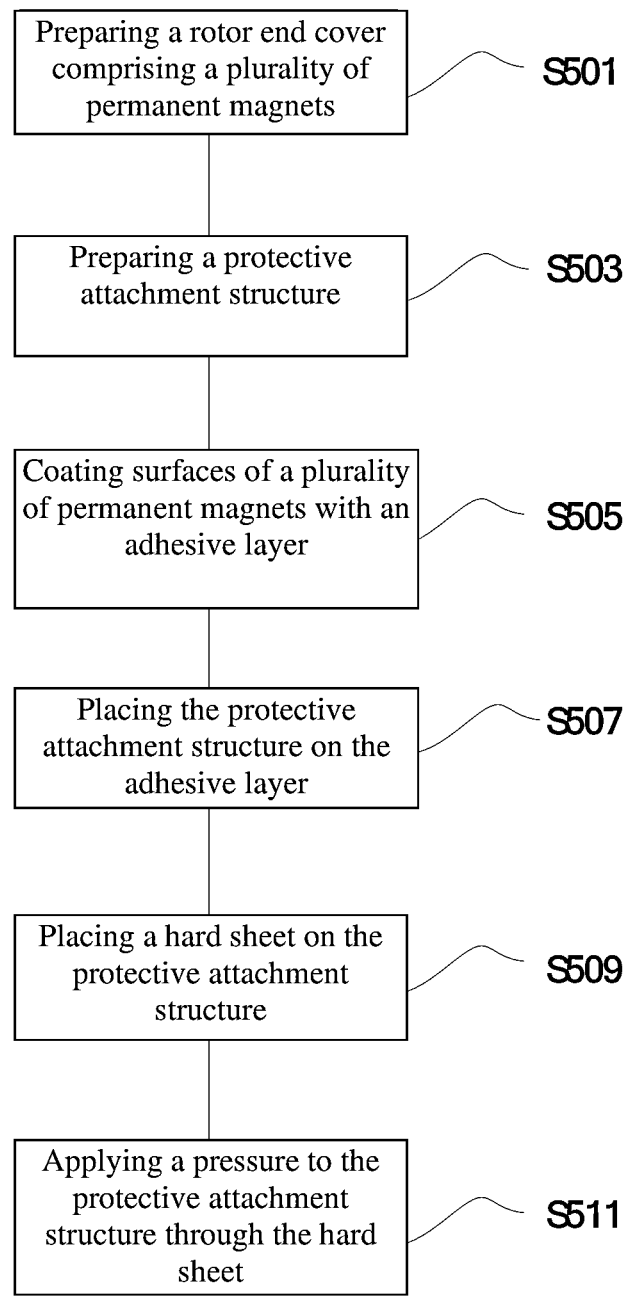
FIG. 5 shows a method for manufacturing a permanent magnet rotor structure for a motor according to an exemplary embodiment of the application.

FIG. 5 shows a method for manufacturing a permanent magnet rotor structure for a motor according to an exemplary embodiment of the application.

Referring to FIG. 5, S501, preparing a rotor end cover comprising a plurality of permanent magnets.

Referring to FIG. 5, S503, preparing a protective attachment structure.

Referring to FIG. 5, S505, coating surfaces of a plurality of permanent magnets with an adhesive layer.

Referring to FIG. 3, in this embodiment, the adhesive layer 306 is made of a silicone structural adhesive. The silicone structural adhesive has good adhesion, sealing preformation and corrosion resistance. The cured silicone structural adhesive layer 306 is not only waterproof and corrosion resistant, but also has excellent mechanical properties, such as creep resistance and impact resistance.

Referring to FIG. 5, S507, placing the protective attachment structure on the adhesive layer.

Referring to FIG. 3, in this embodiment, the material of the protective attachment structure 308 in the silicone structural adhesive layer 306 is polyamide fiber cloth, commonly known as nylon cloth. The nylon cloth is a synthetic fiber cloth with light weight, corrosion resistance, good ductility and low cost. In addition, the silicone structural adhesive can soak into the nylon cloth well, so that these two can be fused without destroying their chemical structure, and protect the permanent magnet structure together.

Referring to FIG. 5, S509, placing a hard sheet on the protective attachment structure.

Referring to FIG. 5, S511, applying a pressure to the protective attachment structure through the hard sheet.

As shown in FIG. 3, the silicone structural adhesive layer 306 of the permanent magnet rotor structure in this embodiment has the adhesive layer 310 with a smooth surface. In this embodiment, after the silicone structural adhesive 306 completely soaks into the nylon cloth 308, when the silicone structural adhesive 306 is not cured, a PVC hard sheet is placed on its surface, and then permanent magnets or iron blocks are placed on a surface of the PVC hard sheet. In the first place, the PVC hard sheet is different from the stainless steel sheet in above embodiment in that it does not need demoulding pre-treatment before being placed, but can be placed directly on the surface of the silicone structural adhesive, so that time is saved. In the second place, by placing the permanent magnets or iron blocks on the surface of the PVC hard sheet, a magnetic force is generated by the interaction between the permanent magnets or iron blocks and the plurality of permanent magnets 304 in the rotor end cover 302, and acts on the adhesive layer 306 and the protective attachment structure 308 in a radial direction, so that excess adhesive and bubbles on the surface of the adhesive layer can be eliminated.

After the silicone structural adhesive is completely cured, the external permanent magnets or iron blocks and the PVC hard sheet are removed to obtain the permanent magnet rotor structure as shown in FIG. 3.

Similarly to the above embodiment, the corrosion resistance and wear resistance of the structure in this embodiment are verified by experiments.

Three embodiments of the application have been illustrated above. Different from the above background art, according to the application, by coating the permanent magnet rotor structure of the underwater motor with the structural adhesive, the motor is effectively protected against corrosion, and by adding the protective attachment structure, the permanent magnets are effectively protected against damage from hard objects in the working environment. In addition, the adhesive layer with the smooth surface mentioned in the application indirectly protects the permanent magnets. Further, various materials with low cost and excellent mechanical properties may be used in combination to produce the permanent magnet rotor structure in the application in batch.

Finally, it should be noted that the above embodiments are only preferred ones of the application, and are not intended to limit the application. Although the application has been described in detail with reference to the foregoing embodiments, it is still possible for those skilled in the art to modify the technical schemes of the foregoing embodiments or replace some of the technical features therein equivalently. Any modification, equivalent replacement and improvement made within the spirit and principle of the application should be included in the scope of protection of the application.

What is claimed is:

1. A permanent magnet rotor structure for an underwater motor, comprising:
   a rotor end cover;
   a plurality of permanent magnets arranged on an inner circumferential surface of the rotor end cover;
   a protective attachment structure; and
   an adhesive layer having a first part for adhering the protective attachment structure to the surfaces of the plurality of permanent magnets and a second part for covering the protective attachment structure;
   wherein the protective attachment structure comprises a 316L stainless steel mesh, and a thickness of the 316L stainless steel mesh ranges from 0.01 mm to 0.07 mm.

2. The permanent magnet rotor structure according to claim 1, wherein the adhesive layer has a smooth surface.

3. The permanent magnet rotor structure according to claim 1, wherein a surface of the adhesive layer is free of any visible bubble.

4. The permanent magnet rotor structure according to claim 1, wherein the adhesive layer comprises an acrylic structural adhesive.

5. The permanent magnet rotor structure according to claim 1, wherein the adhesive layer seals the plurality of permanent magnets.

6. The permanent magnet rotor structure according to claim 1, wherein the protective attachment structure is made of a nonmagnetic material.

7. An underwater motor, comprising the permanent magnet rotor structure according to claim 1.

8. Underwater equipment, comprising the underwater motor according to claim 7.

* * * * *